No. 839,235. PATENTED DEC. 25, 1906.
M. VAN BOXEL.
NUT LOCK.
APPLICATION FILED NOV. 20, 1905.

Witnesses
C. H. Olds.
Geo. S. Cole.

Inventor
Mathew Van Boxel
by Wm M. Monroe
Attorney

UNITED STATES PATENT OFFICE.

MATHEW VAN BOXEL, OF CLEVELAND, OHIO.

NUT-LOCK.

No. 839,235.  Specification of Letters Patent.  Patented Dec. 25, 1906.

Application filed November 20, 1905. Serial No. 288,168.

To all whom it may concern:

Be it known that I, MATHEW VAN BOXEL, a citizen of the United States, and a resident of Cleveland, county of Cuyahoga, State of Ohio, have invented certain new and useful Improvements in Nut-Locks, of which I hereby declare the following to be a full, clear, and exact description, such as will enable others skilled in the art to which it appertains to make and use the same.

The objects of the invention are to provide a locking device for a bolt and nut in situations where constant vibration or shock, as in railway-beds and in rolling-stock, is likely to loosen the nuts upon the bolts employed, and if the accident should not be discovered it is likely to result in the spreading of the rails or in the separation of structural parts in the train above the rail and to produce a serious accident.

The invention is exemplified in the accompanying drawings hereinafter described, and specifically pointed out in the claim.

Figure 1:
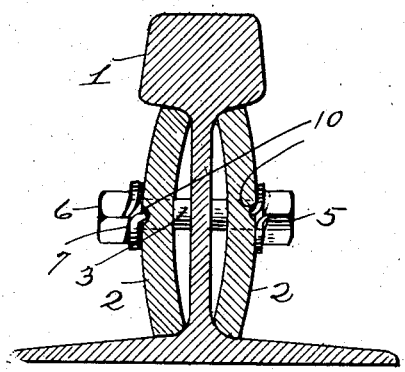
Figure 2:
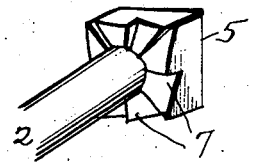
Figure 4:
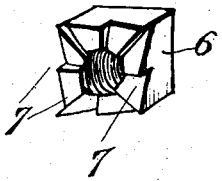
Figure 3:
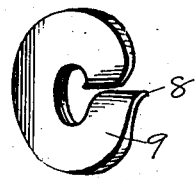

In the accompanying drawings, Figure 1 is a view in section, showing a split washer at each end of bolt. Fig. 2 is a perspective view of the inside of the bolt-head. Fig. 3 is a perspective view of one of the washers employed, and Fig. 4 is a view of the nut.

The invention comprises a split washer, tempered to a strong spring resistance and having the adjacent edges of the opening therein turned abruptly outward. The edges of the washer are designed to engage suitable grooves in the nut through which the bolt is passed, and the washer and grooves are repeated at the head of the bolt.

In the drawings accompanying this specification, 1 is the rail; 2, the fish-plate; 3, the bolt. The nut 6 is provided with angular ratchet-grooves 7 on its inner face. One edge 8 of the split washer 9 will engage with the grooves in succession as the nut is rotated and will spring easily in one direction, that in which the nut is screwed upon the bolt, but cannot spring in the other direction on account of the sharp angular shoulder of the ratchet.

To maintain the nut and washer where placed upon the surface of the fish-plate or other metal device through which the bolt passes, a groove 10 is radially cut at the edge of the bolt-hole, in which one edge of the split washer rests. This cut is not angular but rounding at the bottom, so that by means of a violent effort with a wrench the edge of the washer can be forced out of it and the nut unscrewed; but this cannot be accomplished by any vibration or shock such as is likely to occur to the nut while in use The head 5 of the bolt is cut with ratchets on the inside similarly to the nut, and a groove is cut on the part through which the bolt passes next to the head, just as for the nut. A second washer then retains the bolt from turning, and the first washer prevents the nut from turning on the bolt.

The washer must be suitably tempered, so as to be stiff and yet capable of yielding to screw on the nut. It must also be tempered so as not to break easily.

Having described the invention, what I claim as new, and desire to secure by Letters Patent, is—

The combination with a bolt and metal pieces through which it passes, of means for securing the bolt from turning in said pieces, and the nut from turning upon the bolt, comprising, a split washer underneath the head and nut, the said washer having its ends oppositely turned and tempered, ratchet-grooves on the inner faces of head and nut, and non-shouldered grooves in the metal faces adjoining the washers, substantially as described.

In testimony whereof I hereunto set my hand this 27th day of September, 1905.

MATHEW VAN BOXEL.

Witnesses:
 WM. M. MONROE,
 GEO. S. COLE.